Feb. 14, 1933.　　　J. G. DICKSON　　　1,897,891
GRINDING HEAD AND DRIVE
Filed Jan. 7, 1931
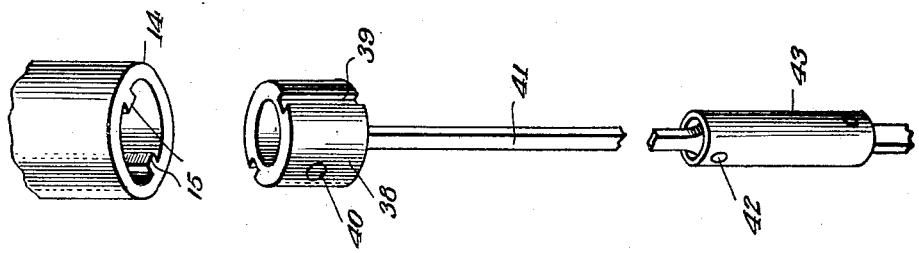
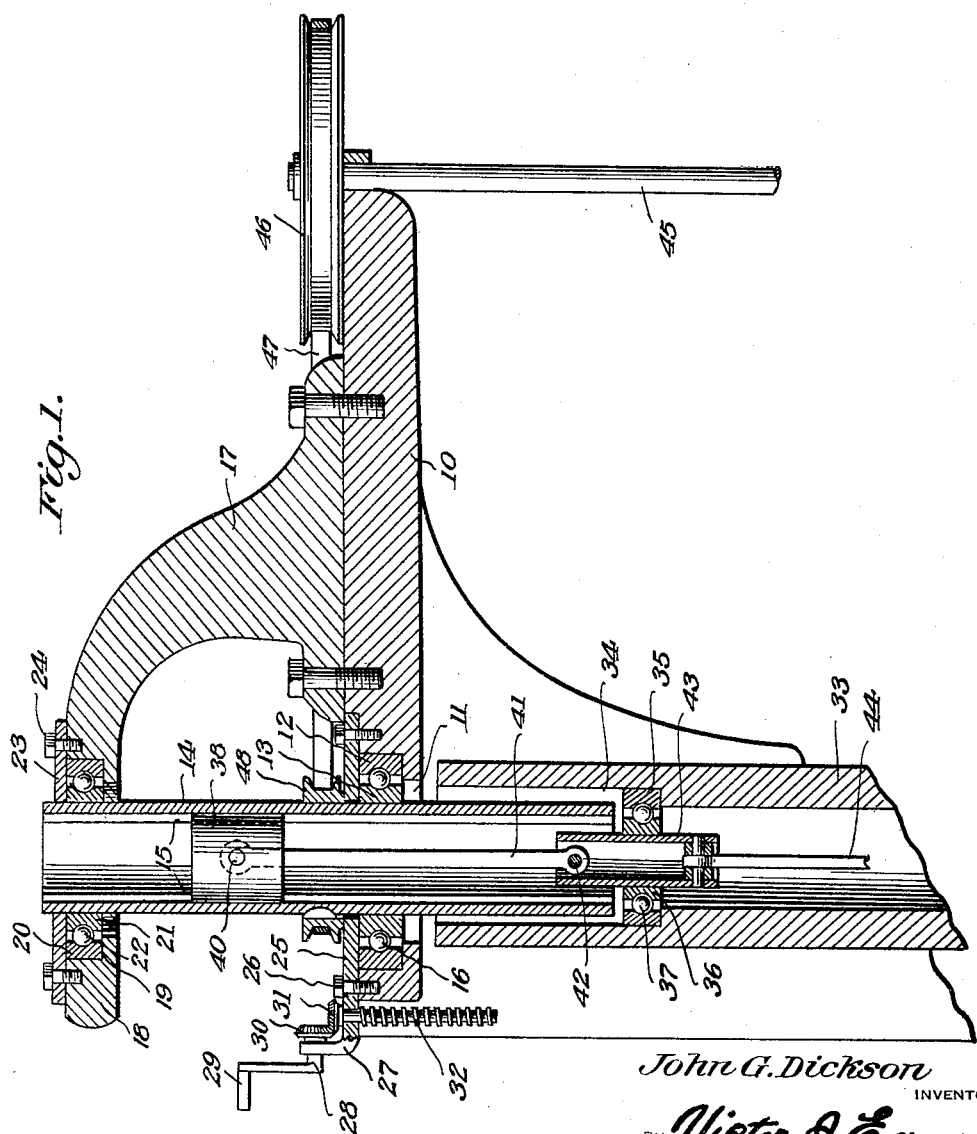
John G. Dickson
INVENTOR
BY Victor J. Evans
ATTORNEY Patented Feb. 14, 1933

1,897,891

UNITED STATES PATENT OFFICE

JOHN G. DICKSON, OF SAN DIEGO, CALIFORNIA

GRINDING HEAD AND DRIVE

Application filed January 7, 1931. Serial No. 507,250.

This invention relates to grinding machines capable of use for various purposes, such, for instance, as reboring or dressing out the cylinders of internal combustion engines and has for its object the provision of a grinding machine having an improved mounting and drive mechanism as compared with the ordinary types, the advantage being that the lateral strain ordinarily coming upon the grinding bar, resulting in disalinement thereof, will be entirely avoided, the driving strain being taken up by suitable bearing devices.

An important object of the invention is to provide a drive and mounting arrangement which may be considered as an improvement on already existing machines for this same general purpose, it being however possible that the invention be incorporated in an absolutely new structure, as such would readily be within the scope of what is intended.

An additional object is to provide a structure of this character which will be simple and inexpensive in manufacture, positive in action, efficient and durable in service, and a general improvement in the art.

With the above and other objects and advantages in view the invention consists in the details of construction and the arrangement of elements to be hereinafter more fully described and claimed, and illustrated in the accompanying drawing, wherein:—

Figure 1 is a fragmentary vertical longitudinal section through a machine embodying the invention, and Figure 2 is a detail perspective view showing the guide sleeve and sliding block disconnected or detached.

Referring more particularly to the drawing, I have shown the machine as comprising a frame 10 having an opening 11 therein within which is mounted an outer race 12 within the confines of which is located an inner race 13 within which is secured a rotary tubular guide 14 provided at diametrically opposite points with longitudinaly extending gibs or keys 15 preferably formed integrally thereon though capable of being attached thereto if preferred. Bearing balls 16 are located between the inner and outer races 12 and 13 so as to provide an efficient ball bearing structure.

Secured to the frame 10 is a bracket member 17 having a horizontal portion 18 overlying the frame. The overlying portion 18 of the bracket is provided with a recess 19 within which is located an outer race 20 within which is disposed a race 21 surrounding the tubular guide 14, bearing balls 22 being arranged between the two races. Secured on top of the overlying portion 18 of the bracket arm 17 is a retaining plate 23 which holds the ball bearing structure defined by the races and bearing balls in proper position, this plate being held in place by bolts or studs 24. The ball bearing structure defined by the races 13 and 12 and ball bearings 16 is held in place on the frame by a plate member 25 secured in place by studs or bolts 26. At its forward end this plate member is provided with an upturned lug or extension 27 through which is journaled a crank 28 having a handle 29 thereon and carrying a bevel gear 30 meshing with a bevel gear 31 on an adjusting screw member 32 which extends downwardly as clearly indicated.

Located beneath the frame 10 is a tubular guide member 33 provided with a recess 34 within which is mounted an outer race 35 within which is located an inner race 36, bearing balls 37 being disposed between the tubes. The tubular guide 14 extends downwardly to a point slightly spaced from the ball bearing structure defined by the races 35 and 36 and the bearing balls 37 as clearly indicated.

Slidably mounted within the tubular guide 14 is a block member 38 of cylindrical form provided in opposite sides with grooves 39 slidably mounted upon the gibs or keyways 15 so as to be non-rotatable with respect to the tube 14 which is intended to be rotated by means to be described. Pivotally connected with this block member, as shown at 40, is a connecting rod 41 which extends downwardly and which is pivotally connected at 42 with a tubular member 43 mounted within the inner race 36 of the lowermost ball bearing structure. This member 43 carries the grinding bar 44 which is of course equipped with the usual emery wheel or other grinding wheel, not shown.

The drive means comprises a suitable shaft 45 journaled at the rear portion of the frame 10 and carrying a pulley 46 about which is trained a belt 47 which in turn is peripherally engaged about a pulley 48 keyed to the tubular member 14.

In the operation of the device, it will be observed that the general operation is the same as in other machines of this same general class. However, it will be observed that the lateral strain applied to the tubular member 14 by virtue of the engagement of the belt about the pulley thereon will be taken up by the three ball bearing devices formed by the inner and outer races with the bearing balls interposed therebetween. Obviously, there can then be no lateral strain upon the grinding bar to bring it out of alinement and the machine will therefore operate in a far more efficient manner than is possible with the ordinary type. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In a grinding machine, a frame, a rotatable tubular guide vertically arranged and extending through the frame, ball bearing structures supporting the guide where it passes through the frame, a block slidably and non-rotatably mounted in the tubular guide, a spindle for driving a grinding tool, intermediate connecting means between said block and spindle, a pulley on said tubular guide, a pulley journally mounted on the frame, and a belt trained about both pulleys for rotating the tubular guide.

2. In a machine of the character described, a frame, a bracket member mounted on the frame and having a portion overlying the same, a ball bearing structure in the overlying portion of the bracket member, a ball bearing structure in the frame, a tubular guide vertically arranged and mounted within the ball bearing structures and rotatable with the inner elements thereof, longitudinally extending keys in the guide, a block slidably and non-rotatably mounted in the guide and grooved for engagement with the keys, a second tubular guide located beneath the frame in concentric relation to the first named tubular guide and containing a ball bearing device, a member mounted within the last named ball bearing device and carrying a spindle of a grinding tool, a connection between said block and said last named tubular member, a pulley on the first named tubular member, a second pulley journaled upon the frame, and a belt trained about both pulleys for rotating the tubular guides.

3. In a machine of the character described, a frame, a bracket member mounted thereon and having a portion overlying the same, an outer ball race seated within a recess in the bracket member, an outer ball race seated within a recess in the frame, a vertically arranged tubular guide extending through the frame and bracket member and carrying inner races arranged opposite the respective first named outer races, bearing balls disposed between the confronting outer and inner races, plates secured upon the frame and upon the bracket member respectively and overlying the associated outer and inner races, a second tubular guide located beneath the frame and telescopically receiving the first named tubular guide and containing a ball bearing structure, longitudinally extending keys within said first named guide, a block grooved in its periphery for sliding and non-rotatable engagement within the first named guide, a tubular element extending through the ball bearing structure in the last named tubular guide and carrying a pivotally mounted spindle for supporting a grinding tool, and a connecting rod pivotally connected with said block and pivotally connected with said last named tubular element.

In testimony whereof I affix my signature.

JOHN G. DICKSON.